April 19, 1927.  L. C. SNYDER  1,625,750
TIRE
Filed Jan. 6, 1926   2 Sheets-Sheet 1
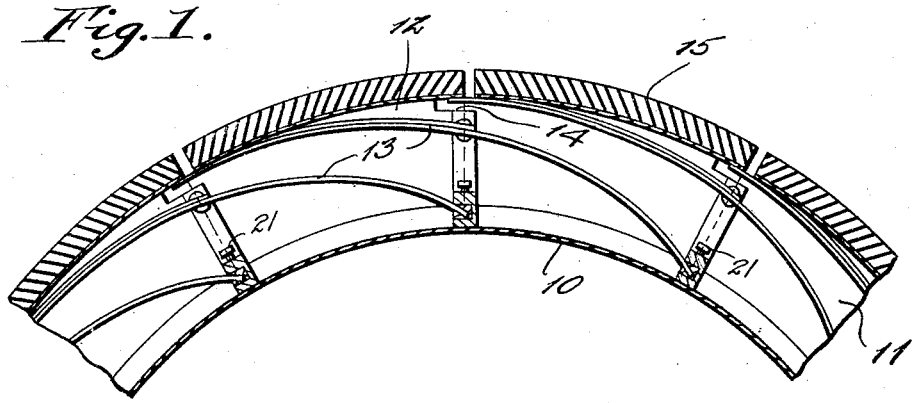
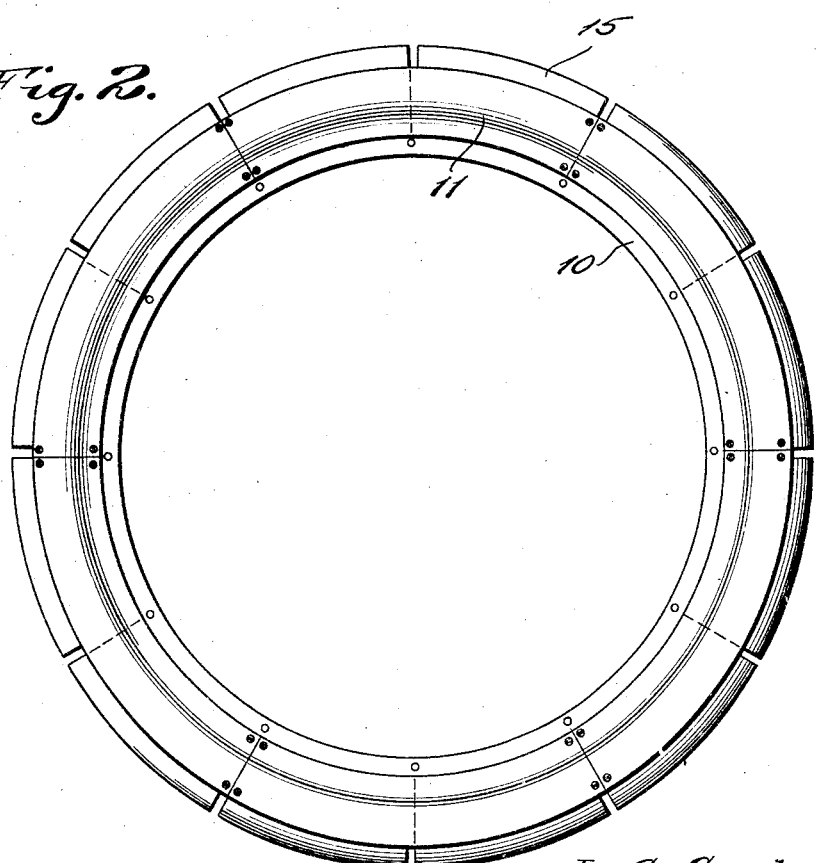

April 19, 1927.  L. C. SNYDER  1,625,750

TIRE

Filed Jan. 6, 1926  2 Sheets-Sheet 2

L. C. Snyder
INVENTOR

BY Victor J. Evans
ATTORNEY

WITNESS:

Patented Apr. 19, 1927.

1,625,750

UNITED STATES PATENT OFFICE.

LOUIS C. SNYDER, OF BOONVILLE, INDIANA.

TIRE.

Application filed January 6, 1926. Serial No. 79,628.

This invention has for its object the provision of a tire designed to possess the desired resiliency, and at the same time eliminate the use of a pneumatic tube to avoid trouble and expense incident to the puncturing or blowing out of said tube.

In carrying out the invention I contemplate the provision of a tire, embodying amongst other features an inner and an outer rim, the latter being constructed of a circumferential series of sections interconnected and separated by resilient elements whereby a plurality of said sections yield in unison to properly support the weight of the vehicle and to take up the shocks and jars with the same cushioning effect as that afforded by the use of a pneumatic tube.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary longitudinal sectional view through a tire constructed in accordance with the present invention.

Figure 2 is a side elevation of the tire.

Figure 3:
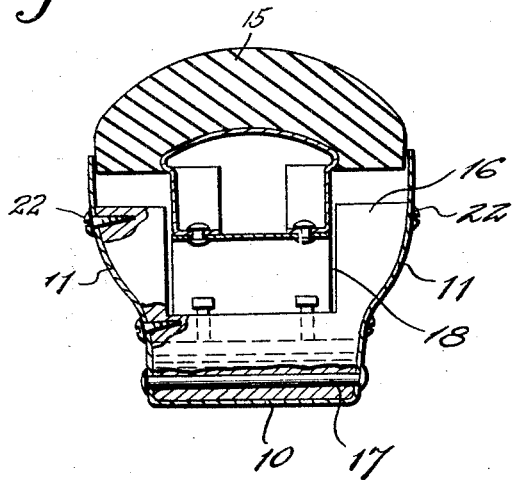
Figure 3 is a transverse sectional view therethrough.
Figure 4:
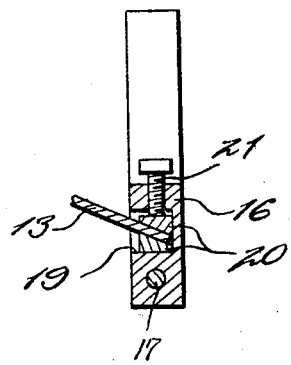
Figure 4 is a view in section of one of the stirrups or spring supports.

The tire forming the subject matter of the present invention includes an inner rim or band 10 adapted to be supported on the felly of the wheel, as will be readily understood, and this rim may vary in size and cross sectional contour without departing from the spirit of the invention, although it is preferably of U-shaped configuration in cross section, as clearly illustrated in Figure 3. The tire further includes what I term an outer rim made up of a plurality of yieldably supported sections to be hereinafter described, but this outer rim is adapted to yield or operate between side plates or members 11 which are integral parts of the inner rim 10, and preferably curved in the manner shown in Figure 3. Each of these side plates is of annular contour.

Figure 5:
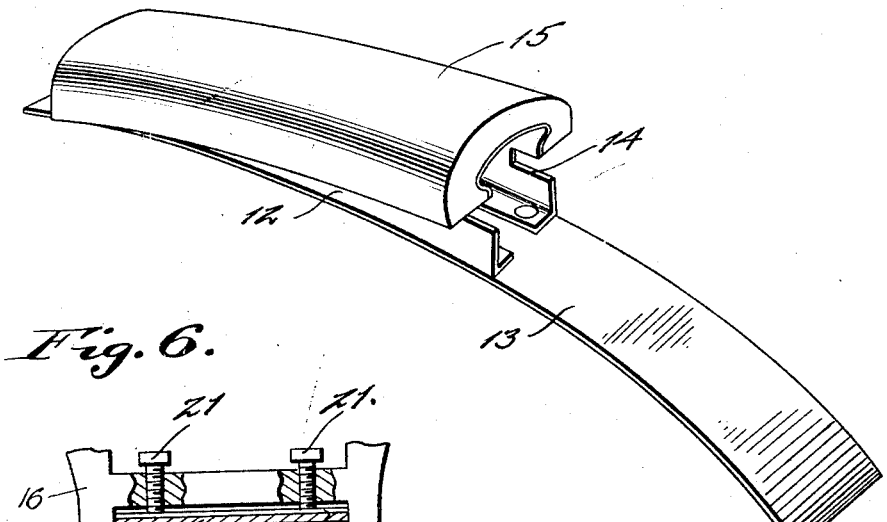
Figure 5 is a perspective view of one of the springs and section of the outer rim.
Figure 6:
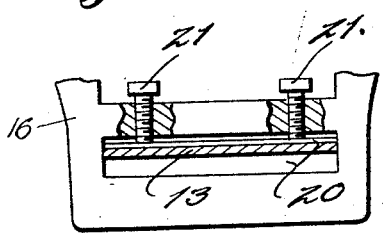
Figure 6 is a view partly in section and at right angles to Figure 4.

Each section of the outer rim is constructed in the manner illustrated in Figure 5 and embodies a shoe 12 which is supported upon a curved leaf spring 13 adjacent one end thereof and secured thereto in any suitable manner, the shoe being tapered as shown in Figure 1, with the wide or large end of the shoe provided with a slot 14 for a purpose to be presently set forth. Each shoe is covered by a length of some relatively soft material 15, preferably rubber, it being of course understood that the shoe 12 is constructed of some rigid material such as metal or the like. These sections of the outer rim are supported upon the inner rim in the manner shown in Figures 1 and 2, wherein it will be noted that the coverings 15, while arranged end to end, are slightly spaced apart to permit said sections of the outer rim to properly yield against the resistance of the springs 13. These springs, as above stated, are curved and arranged in a circumferential series about the inner rim 10, and have their corresponding inner extremities fixed with relation to the inner rim, while their corresponding outer extremities are tangentially disposed as shown. It will be further noted that each spring is spaced from the inner rim 10 and overlies the next adjacent spring, while the free extremity of each spring projects a slight distance beyond the shoe 12 to be slidably received by the slot 14 in the adjacent shoe or section of the outer rim. By reason of this construction and arrangement of parts it is manifest that two or more sections of the outer rim at opposite sides of the vertical center of the wheel yield simultaneously during the rotation of the wheel upon which the tire is mounted, and in this way the weight of the vehicle, as well as the shocks and jars encountered incident to the rotation of the wheel, is properly distributed over a large section of the tire, gradually yielding and expanding in a manner to prevent sudden rebounds.

While the springs 13 may be supported within the tire in any suitable manner, I preferably make use of what I term a stirrup or spring support indicated at 16, there being one of these supports for each spring, as clearly illustrated in Figure 1. The supports are fixed to the inner rim 10 by means of transverse bolts 17, and are provided with cut-away portions 18 through which the next adjacent spring passes. The base portion of each stirrup is provided with a recess or slot 19 to receive the inner end of the adjacent spring 13, the latter being clamped in said recess by means of spaced clamping elements 20 and a fastening screw or element 21 which when tightened hold said elements 20 in clamping relation. If necessary, any one of more sections of the tire can be removed and replaced by new sections after removing one of the side plates 11 of the tire, which plates are also secured to the supports or stirrups 16 by suitable fastening elements 22.

While it is believed that from the foregoing description the nature and advantages of the invention will be readily apparent, I desire to have it understood that I do not limit myself to what is herein shown and described, and that such changes may be made when desired as fall within the scope of what is claimed.

Having thus described the invention, what is claimed as new, is:—

1. A tire comprising a rim, a circumferential series of stirrups supported by said rim, a circumferential series of springs constituting resilient elements, each having its inner end secured to one of said stirrups, each of said elements projecting through the next adjacent stirrup, with all of said springs being curved and having their corresponding outer extremities arranged tangentially in overlapping relation, a tapered shoe supported by each resilient element, and secured thereto, all of said shoes unitedly defining a sectional outer rim, the free end of each element being slidably associated with the shoe of the next adjacent spring, and a covering of relatively soft material for each section.

2. A tire comprising a rim, a circumferential series of resilient elements having their inner extremities fixed with relation to the rim, and their outer extremities spaced in overlapped relation and tangentially disposed, a tapered metallic shoe including opposed angular shaped members arranged upon and secured to each element adjacent the free end thereof, said members being slotted at their inner ends to slidably receive the adjacent end of the next resilient element, a covering of relatively soft material carried by each shoe, and said shoes unitedly defining a sectional outer rim.

In testimony whereof I affix my signature.

LOUIS C. SNYDER.